Nov. 6, 1962    J. SHAW    3,062,065
CHANGE-SPEED DRIVES
Filed Oct. 16, 1959
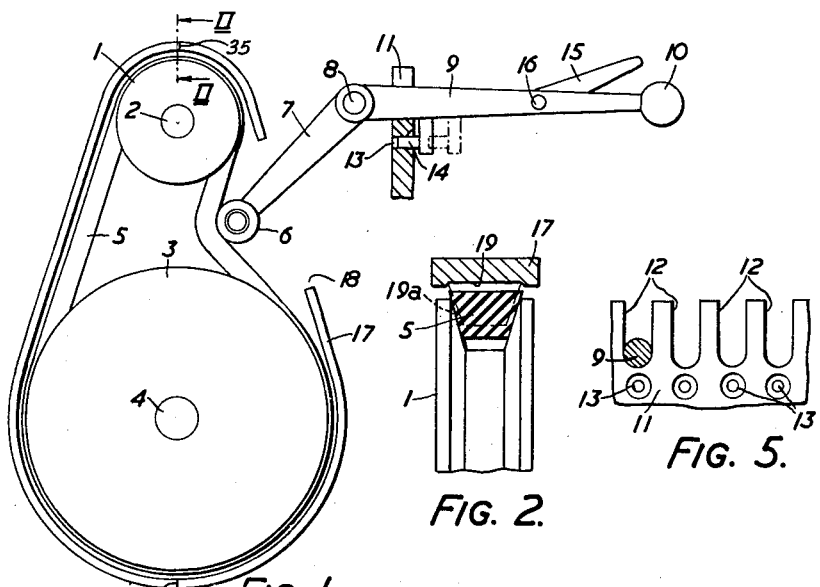
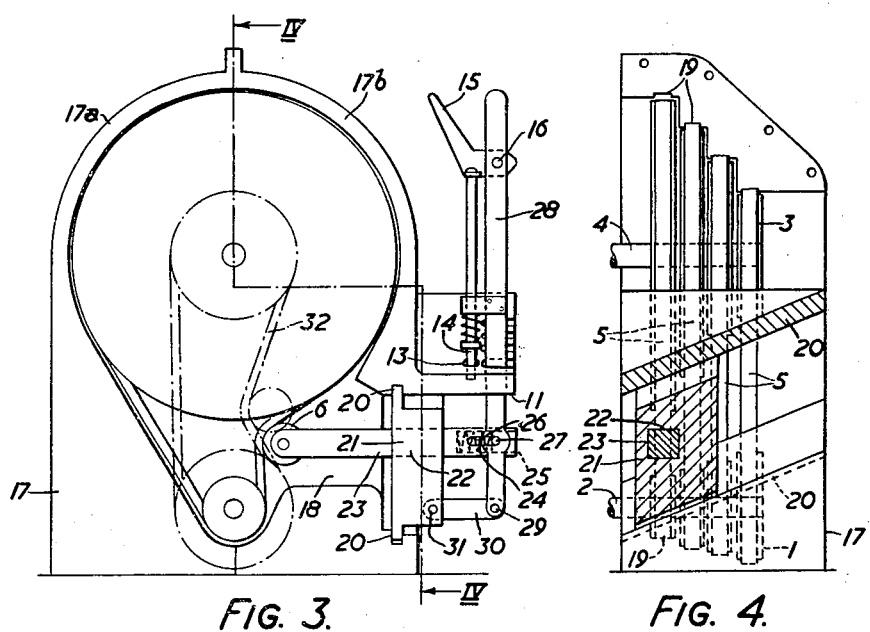
INVENTOR
JOHN SHAW
BY Irwin S. Thompson
ATTORNEY

United States Patent Office
3,062,065
Patented Nov. 6, 1962

1

3,062,065
CHANGE-SPEED DRIVES
John Shaw, Cheltenham, England, assignor to The Tungum Company Limited, Cheltenham, England
Filed Oct. 16, 1959, Ser. No. 846,997
Claims priority, application Great Britain Oct. 21, 1958
9 Claims. (Cl. 74—217)

This invention relates to change-speed drives of the type wherein a pair of matched oppositely stepped pulleys formed with sections of differing effective diameter are coupled by a belt which engages an aligned pair of the pulley sections.

Change-speed belt drives of the aforesaid type normally employ a single belt which is moved from one aligned pair of pulley sections to another aligned pair thereof when it is desired to change the drive ratio between the pulleys. Drives of this form are commonly used for driving machine tools, for example small lathes and drilling machines, where the cost of providing a geared head embodying toothed gearing is not justified.

Although the matching of the pulleys is normally such that a constant centre spacing of the pulley shafts is obtained when a drive is being transmitted, the shafts must be mounted so that this centre spacing can be reduced during a ratio-changing operation sufficiently to enable the belt to be moved from one aligned pair of pulley sections to another. Additional disadvantages are that the machine must be stopped and any belt guards removed or displaced during the ratio-changing operation.

An object of the invention is to provide a variable speed drive of the aforesaid type which enables ratio-changing to be effected considerably more rapidly than hitherto without it being necessary to stop the driving pulley, and in particular without it being necessary to vary the centre spacing of the pulley shafts during the ratio-changing operation.

A further object is to provide a new or improved change-speed drive of the foregoing type comprising a plurality of belts individually associated with the pairs of aligned pulley sections and of a length such that in a free condition they are substantially out of driving engagement with the pulleys, and jockey means which can be selectively engaged with any one of the belts whereby the selected belt will be brought into driving engagement with the corresponding pair of aligned pulley sections.

Preferably the jocket means comprise a freely rotatable jockey pulley which can be engaged selectively with the outer peripheries of the belts, and the jockey pulley may be resiliently urged into such engagement.

An element is preferably arranged outwardly of each belt so as to be spaced therefrom and clear the belt when the latter is in driving engagement with its pulley sections and so that when the belt is not tensioned by the jockey pulley it will adopt, under the influence of its natural resiliency, a constrained position with its outer periphery in engagement with the element whilst free of its pulley sections. An element of continuous form may be disposed around each belt, and this element preferably has a longitudinal groove on its inner surface in which the belt seats when not tensioned by the jockey pulley.

With a machine, for example a drilling machine, utilizing a change-speed drive according to the invention a non-slip positive drive is provided in all speed ratios, and any one of the available ratios can be instantly engaged without stopping the machine. Preferably a single jockey pulley is provided which can be moved into engagement with any one of the belts, and this prevents the possibility of a plurality of belts being tensioned simultaneously.

2

A change-speed drive according to the invention is especially suitable for use with a drilling machine which is adapted for use in a sequence of different drilling, tapping and like operations which may require the employment of several different speed ratios.

Preferably the stepped pulleys are of integral form, though it will be appreciated that they may be of composite form and each comprise separate pulley sections coupled to one another either directly or indirectly, for example by mounting the sections individually on the corresponding pulley shaft.

The invention also provides a change-speed drive assembly comprising a pair of matched oppositely stepped pulleys formed with aligned sections of differing effective diameter, each pair of aligned sections being adapted to be coupled by one of a plurality of belts individually associated with the aligned pairs and in a free condition substantially out of driving engagement therewith, and jockey means adapted to be selectively engaged with any one of the belts when fitted whereby that belt will be brought into driving engagement with the corresponding pair of pulley sections.

Two embodiments of the invention will now be described, by way of example, with reference to the accompanying drawings, in which:

FIGURE 1 is a diagrammatic plan view of one embodiment,

FIGURE 2 is a fragmentary section on the line II—II in FIGURE 1 drawn to a larger scale, FIGURE 3 is a plan view of the second embodiment, FIGURE 4 is a sectional view on the line IV—IV in FIGURE 3, and FIGURE 5 is a fragmentary detail view common to both embodiments.

Both the embodiments are suitable, for example, for application in the change-speed driving head of a pillar type drilling machine, and they are hereinafter described in such an application although the drilling machine itself is not illustrated.

Referring to FIGURES 1, 2 and 5, a stepped driving pulley 1 is mounted on a driving shaft 2 in lateral alignment with an oppositely stepped driven pulley 3 mounted on a driven shaft 4 which is in driving engagement with a drilling spindle (not shown). The shafts 2 and 4 which are used with a pillar type drilling machine are both parallel and vertical, are mounted at a fixed centre spacing and the driving shaft 2 is in use coupled to a suitable electric motor (not shown).

A plurality of similar V belts 5 are individually associated with the pairs of pulley sections which are of differing effective diameters and a jockey pulley 6 is arranged for selective engagement with any one of the belts 5 to tension the latter to bring it into driving engagement with the corresponding pair of pulley sections. The jockey pulley 6 is rotatably mounted at one end of one arm 7 of a cranked change-speed lever which is rotatably and slidably mounted on a vertical shaft 8 disposed at the right hand side of the driving pulley 1 for movement axially therealong. The other arm 9 of the lever extends to one side of the drilling machine and terminates in a knob 10 which can conveniently be gripped by the hand of the machine operator. The operator, by manipulating the change-speed lever 7, 9, can bring the jockey pulley 6 into alignment with any one of the belts 5 and then into engagement with that belt to tension the latter and bring it into driving engagement with the corresponding pair of pulley sections. When a belt is so tensioned, the jockey pulley 6 is disposed substantially equidistant from the peripheries of the pulley sections concerned.

The change-speed lever 7, 9 engages in a selector gate 11, shown in end elevation in FIGURE 5, and provided with a series of notches 12, in any one of which the arm 9 of the change-speed lever can be engaged when the jockey pulley 6 is aligned with the corresponding belt. A detent bore 13 is provided in the gate 11 alongside each notch 12 and a detent locking pin 14 engages in one of the bores 13 when the lever 7, 9 is positioned to tension the corresponding belt. The locking pin 14 is slidably mounted on the change-speed lever 7, 9 and is spring urged towards the gate 11.

A detent release lever 15, pivoted on the arm 9 of the change-speed lever about a pivot pin 16, is suitably positioned for displacement by the operator grasping the arm 9 of the change-speed lever, and such displacement disengages the locking pin 14 from the detent bore 13 with which it is engaged. The arm 9 of the change-speed lever can now be moved into another notch 12 of the gate 11, and when the detent release lever 15 is released by the operator, the locking pin 14 enters the bore 13 with which it is aligned. Engagement of the locking pin 14 in a detent bore 13 serves to retain the change-speed lever in the angular sense to tension the corresponding belt.

A shroud element 17 is arranged outwardly of each belt 5 and surrounds the entire run of the latter apart from a small gap 18 which enables the lever arm 7, 9, carrying the jockey pulley 6 to be moved from belt to belt. This element 17 clears the outer periphery of the corresponding belt 5 when the latter is tensioned by the jockey pulley 6, and when the belt 5 is not so tensioned the latter adopts a constrained position in engagement with the element 17 whilst free of its pulley sections. As a result of its natural resiliency the belt would, but for the constraining influence of the element 17 and the pulleys 1 and 3, tend to take up a substantially circular form when it is not tensioned by the jockey pulley 6, and the surrounding element 17 constrains the intermediate portion of the belt 5 between the pulleys 1 and 3 so that the belt 5, when not tensioned, engages with the element 17 throughout substantially its entire periphery.

Each element 17 is formed with a longitudinal groove 19 on its inner surface, in which the corresponding belt 5 seats when free to do so as shown at 19a, and this groove 19 restrains the belt 5 vertically so that it does not rest on the lower flanges of its pulley sections. The elements 17 are each slit at 35 in the plane containing the axes of the pulley shafts 2 and 4, so that the elements 17 can be parted and removed laterally from the pulleys 1 and 3 and the belts 5 for maintenance purposes and belt changing.

The second embodiment, shown in FIGURES 3, 4 and 5, which use identical reference numerals for parts which are common to both embodiments, differs from the first embodiment in the construction of the element 17 and the actuating mechanism for the jockey pulley 6.

The element 17 is an iron casting forming a shroud which encompasses the entire periphery of all the belts 5, except for the small gap 18 for giving the jockey pulley 6 access to the belts 5. The shroud-like element 17 is constituted by two half-shrouds 17a, 17b bolted together in the plane containing the axes of the pulleys 1 and 3.

The shroud-like element 17 has two slide ways 20 in which a slide block 21 is slidable. This slide block 21 has through it a square hole 22 which is a sliding fit with the square shank of a jockey pulley support member 23, at one end of which the jockey pulley 6 is rotatably mounted. The other end of the support member 23 has an axially disposed slot 24 and a substantially cylindrical axial recess 25 housing a compression spring 26 which acts on a pivot pin 27 slidable in the slot 24, whereby the pivot pin 27 is spring urged towards the end of the jockey pulley support member 23 remote from the jockey pulley 6.

An operating lever 28 is pivotally supported by a pin 29 mounted at one end of a link 30, the other end of which is pivotally connected to the slide block 21 by a pin 31. The operating lever 28 is operatively connected to the jockey pulley support member 23 by the pin 27.

The locking mechanism 13 to 16 is the same as that in the first-described embodiment.

Referring specifically to FIGURE 3, it will be noted that clockwise rotation of the operating lever 28 about the pivot pin 29, when the locking mechanism 13 to 16 has been released, results in linear movement of the jockey pulley support member 23, and thus also of the jockey pulley 6, to the right to disengage the jockey pulley 6 from the belt 5.

When the locking pin 14 is engaged in one of the detent bores 13, the jockey pulley 6 is spring-urged into contact with one of the belts 5 under the influence of the spring 26 which is then compressed between the end of the cylindrical recess 25 and the pin 27, the latter adopting an intermediate position between the ends of the slot 24.

As shown in FIGURE 4, the slide ways 20 are inclined to the axes of the pulley shafts 2 and 4 in such a way that the jockey pulley 6 is displaceable substantially along a line which is a locus of points equidistant from the individual conical envelopes of the two pulleys 1 and 3 outside their joint envelope.

Whilst the outline shown in full in FIGURE 3 shows the change-speed drive with the jockey pulley 6 positioned for the minimum speed ratio of the drive, the outline 32, shown in broken lines, shows the position of the jockey pulley 6 and the belt 5 when the former is positioned for the maximum speed ratio of the drive, intermediate pulleys and belts being omitted from the drawings for sake of clarity. The object of the aforementioned inclination of the slide ways 20 is to maintain the jockey pulley 6 substantialy equidistant from the peripheries of the sections of the pulleys 1 and 3 with which it is associated for any one of the available speed ratios.

I claim:

1. A change-speed drive comprising a pair of parallel shafts, a pair of matched oppositely stepped pulleys formed with sections of differing effective diameter and respectively mounted on said shafts, a plurality of belts individually associated with aligned pairs of said pulley sections and of a length such that in a free condition they are out of driving engagement with said pulleys, jockey means which can be selectively engaged with any one of belts to bring the selected belt into driving engagement with the corresponding pair of pulley sections, and a shroud which is split substantially in the plane containing the longitudinal axes of said shafts and with which the belts engage when in a free condition, said shroud being formed with a plurality of grooves with which the belts then engage individually.

2. A change-speed drive according to claim 1, wherein said shroud encompasses closely at least the major portion of all the belts and is constituted by two cast half-shrouds.

3. A change-speed drive comprising a pair of substantially vertical parallel shafts, a pair of matched oppositely stepped pulleys respectively mounted on said shafts, said pulleys being formed with sections of differering effective diameter, a plurality of belts individually associated with aligned pairs of said pulley sections and of a length such that in a free condition they are substantially out of driving engagement with said pulleys, jockey means which can be selectively engaged with any one of belts to bring the selected belt into driving engagement with the corresponding pair of pulley sections, and a shroud with which the belts engage when in a free condition and which is formed with a plurality of grooves with which the belts engage individually when in a free condition so that they are held clear of the pulleys for ease of removal the shroud being split substantially in the plane containing said shafts.

4. A change-speed drive according to claim 3, wherein said jockey means are mounted on a slide block slidably mounted in fixed slide ways.

5. A change-speed drive according to claim 4 wherein the slide ways are formed in the shroud.

6. A change-speed drive according to claim 4 wherein the jockey means are slidably mounted on the slide block for movement towards the belts for engagement with the latter.

7. A change-speed drive according to claim 6, wherein a change-speed lever is provided which can be moved manually to produce corresponding movement of the slide block along the slide ways and of the jockey means relatively to the slide block.

8. A change-speed drive comprising a pair of matched oppositely stepped pulleys, said pulleys being formed with sections of differing effective diameter and mounted for rotation about substantially parallel axes, a plurality of belts individually associated with aligned pairs of said pulley sections, said belts being of a length such that in a free condition they are substantially out of driving engagement with the pulleys, jockey means which can be selectively engaged with any one of the belts to bring said one belt into driving engagement with the corresponding pair of aligned pulley sections, said jockey means being slidably mounted for displacement substantially along a line which is a locus of points equidistant from the individual conical envelopes of said pulleys but outside the joint envelope of the latter, and an internally grooved shroud which is split in the plane containing said parallel axes and is arranged outwardly of said belts so as to be spaced therefrom and clear each belt when the latter is in driving engagement with the corresponding pulley sections and so that when the belt is not tensioned by the jockey pulley it adopts, under the influence of its natural resiliency, a constrained position with its outer periphery in engagement with said grooved shroud while free of its associated pulley sections.

9. A change-speed drive according to claim 8, wherein means are provided for positively locating the jockey means in alignment with a predetermined pulley section.

References Cited in the file of this patent

UNITED STATES PATENTS

| | | |
|---|---|---|
| 897,826 | Gilbert | Sept. 1, 1908 |
| 1,151,837 | Tanewitz | Aug. 31, 1915 |
| 2,419,850 | Norton | Apr. 29, 1947 |